United States Patent
Beneventi et al.

(10) Patent No.: US 12,076,963 B2
(45) Date of Patent: Sep. 3, 2024

(54) PACKAGING MATERIAL; AND A SEALING SYSTEM FOR SUCH PACKAGING MATERIAL

(71) Applicant: TETRA LAVAL HOLDINGS & FINANCE S.A., Pully (CH)

(72) Inventors: Giovanni Betti Beneventi, Modena (IT); Pär Bierlein, Dalby (SE); Gloria Guidetti, Bologna (IT); Michael Wamsler, Dalby (SE); Ladislav Hurdalek, Mladé Buky (CZ)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 123 days.

(21) Appl. No.: 17/623,760

(22) PCT Filed: Jul. 8, 2020

(86) PCT No.: PCT/EP2020/069276
§ 371 (c)(1),
(2) Date: Dec. 29, 2021

(87) PCT Pub. No.: WO2021/005120
PCT Pub. Date: Jan. 14, 2021

(65) Prior Publication Data
US 2022/0258459 A1 Aug. 18, 2022

(30) Foreign Application Priority Data
Jul. 8, 2019 (EP) .................................. 19185032

(51) Int. Cl.
*B32B 27/10* (2006.01)
*B31B 50/66* (2017.01)
(Continued)

(52) U.S. Cl.
CPC .............. *B32B 27/10* (2013.01); *B31B 50/66* (2017.08); *B32B 5/16* (2013.01); *B32B 9/007* (2013.01);
(Continued)

(58) Field of Classification Search
CPC ........ B65D 5/064; B65D 65/40; B32B 27/10; B32B 5/16; B32B 9/007; B32B 9/045;
(Continued)

(56) References Cited

U.S. PATENT DOCUMENTS 4,264,668 A    4/1981 Balla
6,368,686 B1   4/2002 Löfgren et al.
(Continued)

FOREIGN PATENT DOCUMENTS

CN    1668456 A    9/2005
CN    104379340 A    2/2015
(Continued)

OTHER PUBLICATIONS

European Search Report mailed on Jan. 17, 2020 by the European Patent Office in corresponding European Patent Application No. 19185032.0. (8 pages).
(Continued)

*Primary Examiner* — Christopher R Demeree
(74) *Attorney, Agent, or Firm* — BUCHANAN INGERSOLL & ROONEY PC (57) ABSTRACT

A packaging material is provided, comprising a core layer and one or more layers of a heat sealable material laminated thereto, and at least one carbon-based layer being configured to form a workpiece of an associated sealing system.

19 Claims, 8 Drawing Sheets

(51) Int. Cl.
    *B32B 5/16*          (2006.01)
    *B32B 9/00*          (2006.01)
    *B32B 9/04*          (2006.01)
    *B32B 27/32*        (2006.01)
    *B32B 27/36*        (2006.01)
    *B32B 29/00*        (2006.01)
    *B65D 5/06*          (2006.01)
    *B65D 65/40*        (2006.01)

(52) U.S. Cl.
    CPC .............. *B32B 9/045* (2013.01); *B32B 27/32* (2013.01); *B32B 27/36* (2013.01); *B32B 29/002* (2013.01); *B65D 5/064* (2013.01); *B65D 65/40* (2013.01); *B32B 2255/10* (2013.01); *B32B 2255/20* (2013.01); *B32B 2264/108* (2013.01); *B32B 2307/31* (2013.01); *B32B 2307/732* (2013.01); *B32B 2439/40* (2013.01); *B32B 2439/70* (2013.01)

(58) Field of Classification Search
    CPC ....... B32B 27/32; B32B 27/36; B32B 29/002; B32B 2255/10; B32B 2255/20; B32B 2264/108; B32B 2307/31; B32B 2307/732; B32B 2439/70; B32B 2260/025; B31B 50/66; C08K 3/042
    USPC ...... 229/126; 156/274.4; 428/198, 200, 201, 428/204, 206
    See application file for complete search history.

(56) References Cited

U.S. PATENT DOCUMENTS

| | | | | |
|---|---|---|---|---|
| 9,505,254 | B2 * | 11/2016 | Jarvis | ................... B41M 5/3333 |
| 9,586,427 | B2 * | 3/2017 | Jarvis | ....................... B41M 5/26 |
| 10,022,944 | B2 * | 7/2018 | Schuman | ............. C09D 101/00 |
| 2004/0170781 | A1 | 9/2004 | Sickert et al. | |
| 2010/0016137 | A1 | 1/2010 | Benedetti et al. | |
| 2012/0076995 | A1 | 3/2012 | Nilsson et al. | |
| 2015/0166751 | A1 | 6/2015 | Fukumoto et al. | |
| 2017/0107333 | A1 | 4/2017 | Hu et al. | |
| 2022/0033602 | A1 * | 2/2022 | Caruso | ................... B32B 27/14 |

FOREIGN PATENT DOCUMENTS

| | | | |
|---|---|---|---|
| CN | 107892090 | A | 4/2018 |
| EP | 1535729 | A1 | 6/2005 |
| MX | 9606141 | A | 1/1998 |
| RU | 2608025 | C2 | 1/2017 |
| WO | 95/33621 | A1 | 12/1995 |
| WO | 2009112255 | A1 | 9/2009 |

OTHER PUBLICATIONS

International Search Report (PCT/ISA/210) and Written Opinion (PCT/ISA/237) mailed on Sep. 18, 2020, by the European Patent Office as the International Searching Authority for International Application No. PCT/EP2020/069276. (10 pages).

Majee, Subimal, et al., "Scalable inkjet printing of shear-exfoliated graphene transparent conductive films", Carbon, Feb. 12, 2016, pp. 51-57, vol. 102, ScienceDirect, Elsevier Ltd., Oxford, GB. (7 pages).

Search Report issued Oct. 31, 2023, by the Russian Patent Office in corresponding Russian Patent Application No. 2022102197. (2 pages).

* cited by examiner

PACKAGING MATERIAL; AND A SEALING SYSTEM FOR SUCH PACKAGING MATERIAL

TECHNICAL FIELD

The present invention relates to a packaging material, and in particular to a packaging material for forming individual liquid food packaging containers. The present invention also relates to a sealing system configured to provide sealings to said packaging material as well as to a method for manufacturing packaging containers and packaging containers as such.

BACKGROUND

In the recent years, the majority of the producers of food packaging containers are focusing to reach recyclability and sustainability standards promoted by various governments and other institutions, such as the European Union. The objective of these efforts is to deliver a future carton-based packaging container, made to a larger extent of renewable packaging materials, being to a higher degree recyclable, in order to reduce waste and pollution.

However, most producers of the packaging material for forming the packaging containers still integrate a thin foil of Aluminum in the packaging material for food protection. Except for the barrier properties of the Aluminum, the metal foil is also used as a workpiece to provide various heat seals of the packaging material in order to form closed and sealed packaging containers. The heat seals may be longitudinal or transversal in relation to the package dimensions, depending on the desired shape and appearance of the final packaging container.

Sealing of the packaging material is based on the principle of induction heating, inducing eddy current in the Aluminum foil. As the foil is heated, thermal energy is transferred by conduction to the plastic laminate layers of the packaging material which then melt and bond to each other. Upon deactivation of the induction heating, the plastic layers re-solidify to provide a correct and durable sealing. A good sealing of the package containers ensures a sterile content for the entire life-time of the product.

However, Aluminum is not a renewable source hence the extensive use is in conflict with the previously mentioned goal of renewable and recyclable packages. For this reason, developing a packaging material without Aluminum is of ever-growing importance. On the other hand, potential issues to perform an efficient sealing of a packaging material that does not include an Aluminum foil may arise.

SUMMARY

In view of the above disadvantages of the prior art solutions, there is a need for a packaging material not requiring an Aluminum foil, while still allowing for robust sealings. Yet further, an object is to provide a packaging material that allows for induction heating sealing.

According to a first aspect, a packaging material is provided. The packaging material comprises a core layer and one or more layers of a heat sealable material laminated thereto, and at least one carbon-based layer being configured to form a workpiece of an associated sealing system.

With the term "workpiece" it is meant a portion or layer, being configured to generate heat losses, by means of a magnetic field, produced by an electromagnetic device, such as an inductor. The carbon-based portion or layer may thereby be susceptible to induction heating, in order to heat adjacent layers of heat sealable material and bring them to partly melt. The molten or partly molten layers may then fuse and be joint sealed while solidifying again, to each other or to adjacent surfaces. The at least one carbon-based portion or layer may thus be configured to form a workpiece of an associated induction heat sealing system, i.e. it is capable of generating heat by interaction with an electromagnetic field produced by a device such as an inductor in an associated induction heat sealing system.

The core layer may be a cellulose-based material, such as paper or paperboard.

The heat sealable material may comprise a thermoplastic polymer, such as a polyolefin or a polyester. Examples of polyolefins are polyethylenes and polypropylenes, and copolymers and blends thereof. Examples of polyesters are polyethylene terephthalate (PET), polyethylene furanoate (PEF), and biodegradable polyesters such as polylactides (PLA) and polyhydroxyalkanoates (PHA).

The carbon-based layer may be configured to form a workpiece of a transversal sealing system and/or a workpiece of a longitudinal sealing system.

The carbon-based layer may be laminated into the packaging material, i.e. located between adjacent laminate layers, and/or arranged on the exterior surface of the packaging material. The exact positioning of the carbon-based layer may depend on various process parameters, as well as packaging container properties.

The carbon-based layer may be distributed across the entire packaging material such that it forms a continuous layer. Hence, the carbon-based layer may effectively assist in protecting the content of the packaging container made of the packaging material from outside environment.

In another embodiment, the carbon-based layer is applied locally only at one or more areas corresponding to the location of the workpieces of the associated sealing systems, i.e. at the areas of the packaging material that are intended to form part of sealing zones.

The carbon-based layer may be a graphene-based material, and the graphene-based material may comprise graphene or reduced graphene oxide, in one or more layers. Most preferably, the graphene-based material comprises a major amount of graphene or reduced graphene, i.e. graphene obtained by reducing graphene oxide, hereinafter denoted "reduced graphene oxide". Thus, the graphene-based material comprises at least from 50 weight-%, such as from 60 weight-%, such as from 70 weight-%, such as from 80 weight-%, such as from 90 weight-%, such as from 95 weight-%, up to 100 weight-%, based on dry weight, of graphene or reduced graphene oxide materials.

The definition of "graphene" in the term "graphene-based" includes thus reduced graphene oxide, monolayers of graphene, exfoliated flakes of graphene, as well as multi-layer graphene flakes, or so-called graphene platelets, i.e. partly exfoliated flake-shaped stacks of several layers of graphene or reduced graphene oxide up to a number of 20, preferably a number of 10 or fewer, such monolayer flakes.

According to an embodiment, the graphene-based material comprises one or more materials selected from the group consisting of exfoliated flakes of graphene, reduced graphene oxide, graphene monolayer material and multilayer graphene platelets, having up to a number of 20, such as 10 or fewer, stacked monolayer flakes of graphene.

In an embodiment, the graphene-based material comprises a layer obtained from a dispersion of such exfoliated flakes of graphene, reduced graphene oxide or multilayer graphene platelets having up to a number of 20, preferably 10 or fewer, stacked monolayer flakes.

Exfoliated flake-shaped graphene is obtainable e.g. by exfoliation of graphite particles by microfluidic exfoliation or electrochemical expansion or ultrasonic exfoliation. Depending on the nature and performance of the exfoliation process the proportion of pure monolayer graphene flakes vs such multilayer graphene flakes may vary.

Only smaller amounts, i.e. lower than 20 weight-%, such as lower than 10 weight-%, such as lower than 5 weight-%, based on dry weight of the graphene-based material, may be graphite flakes that have been exfoliated to a number of graphene monolayer flakes higher than 20, but which have a smaller lateral particle size than bulky graphite particles, i.e. so-called "graphite nano-platelets", which are thus nano-sized.

Such smaller amounts of such laterally nano-sized graphite flakes may be present as long they do not reduce the performance of the graphene-based material too much. Preferably, nano-graphite flakes/platelets are present in the composition only in lower amounts than 15 weight-%, such as 10 weight-%, such as 5 weight-% or less, based on dry weight. Furthermore, the graphene-based composition may comprise amounts lower than 50 weight-%, such as lower than 40 weight-%, such as lower than 30 weight-%, such as lower than 20 weight-%, such as lower than 10 weight-% dry weight, such as lower than 5 weight-% of conductive and/or magnetic particles. The presence of conductive and/or magnetic metal particles may boost the performance of the portion or layer but its effect remains only auxiliary, i.e. the major part of the induction heat sealing performance of the layer is provided by the graphene-based material. Suitable conductive particles are particles of silver and aluminium, among other conceivable metal particles. The carbon-based, preferably graphene-based, layer may be applied to the packaging material in the form of an ink and/or a dispersion coating.

Suitable application methods are thus the printing methods, such as flexographic printing, rotogravure printing, screen printing, ink-jet printing and various dispersion coating methods, such as slot coating, doctor blade coating, curtain coating and spray coating. By these printing or coating methods, suitable thicknesses of from 0.1 to 25 µm, such as from 0.5 to 20 µm, such as from 0.5 to 10 µm, such as from 0.5 to 8 µm, such as from 0.5 to 7 µm, such as from 0.5 to 6 µm, such as from 0.5 to 5 µm of the carbon-based layer may be applied.

The graphene-based composition may further comprise a solvent and a binder, i.e. a polymer to support the film-forming process in coating and drying of the dispersion or ink. The solvent or dispersing medium may comprise water and/or an organic solvent. The composition may further comprise low amounts based on dry matter, of usual additives in the art, such as thickening agents, anti-foaming agents, waxes and other viscosity and film-forming modifiers.

Alternatively, a similar composition of exfoliated graphene flakes may be formed into a wet sheet coating and compressed under high pressure into a graphene sheet and subsequently dried, such that a compact but flexible sheet of layered graphene flakes is obtained. Such graphene-flake "papers" or sheets may be designed to have relatively high conductivity at a thickness from a few micrometers, such as from 3 µm, such as from 5 µm, up to 70 µm, such as up to 80 µm.

Thus, according to an embodiment, the carbon-based layer is applied to the packaging material in the form of a pre-manufactured, compressed sheet of layered exfoliated flakes of graphene, reduced graphene oxide or graphene monolayer material or multilayer graphene platelets, having up to 20, such as 10 or fewer, stacked monolayer flakes of graphene.

Particularly well-balanced properties of conductivity vs mechanical properties are obtainable by such graphene-flake sheets having a thickness from 15 µm up to 40 µm. The compact but flexible sheet of graphene flakes may be applied to a packaging material as a fully laminated sheet, or by pattern lamination, such as in the form of a tape at the intended sealing zones only.

In a further conceivable embodiment, a graphene coating may be applied in the form of a vapour deposited graphene layer, such as by means of chemical vapour deposition (CVD) at a thickness of from a few nanometers up to 500 nm, such as up to 300 nm.

The thickness of the carbon-based layer may preferably be constant throughout the extension of the layer, and in the range of from 0.001 to 500 µm, such as from 0.01 to 500 µm, such as from 0.1 to 300 µm, such as from 1 to 300 µm depending on sealing system properties, such as power signal frequency, etc.

According to a second aspect, a method of manufacturing a packaging material is provided. The method comprises a step of laminating one or more heat sealable layers of thermoplastic material to a core layer, and a step of applying at least one carbon-based layer to said packaging material, wherein the at least one carbon-based, preferably graphene-based, layer forms a workpiece of an associated sealing system.

The step of applying the carbon-based, preferably graphene-based, layer may be performed in-line during a packaging material lamination process, or as a post-process at the end of a packaging material lamination process.

According to a third aspect, a sealing system for a packaging material is provided. The sealing system comprises at least one electromagnetic device and a workpiece arranged on said packaging material, wherein said workpiece is formed by a carbon-based, preferably graphene-based, layer.

According to a fourth aspect, a packaging container is provided. The packaging container comprises a main body being formed by a packaging material and having at least one sealing arranged at a sealing area, wherein the packaging material comprises a carbon-based, preferably graphene-based, layer arranged at said sealing area.

According to a fifth aspect, a method for manufacturing a packaging container is provided. The method comprises a step of sealing a packaging material by activating an induction heating device such that heat is generated in a workpiece of said packaging material, wherein said workpiece is formed by a carbon-based, preferably graphene-based, layer.

BRIEF DESCRIPTION OF THE DRAWINGS

Embodiments of the invention will now be described, by way of example, with reference to the accompanying schematic drawings, in which.

DETAILED DESCRIPTION

Figure 1:
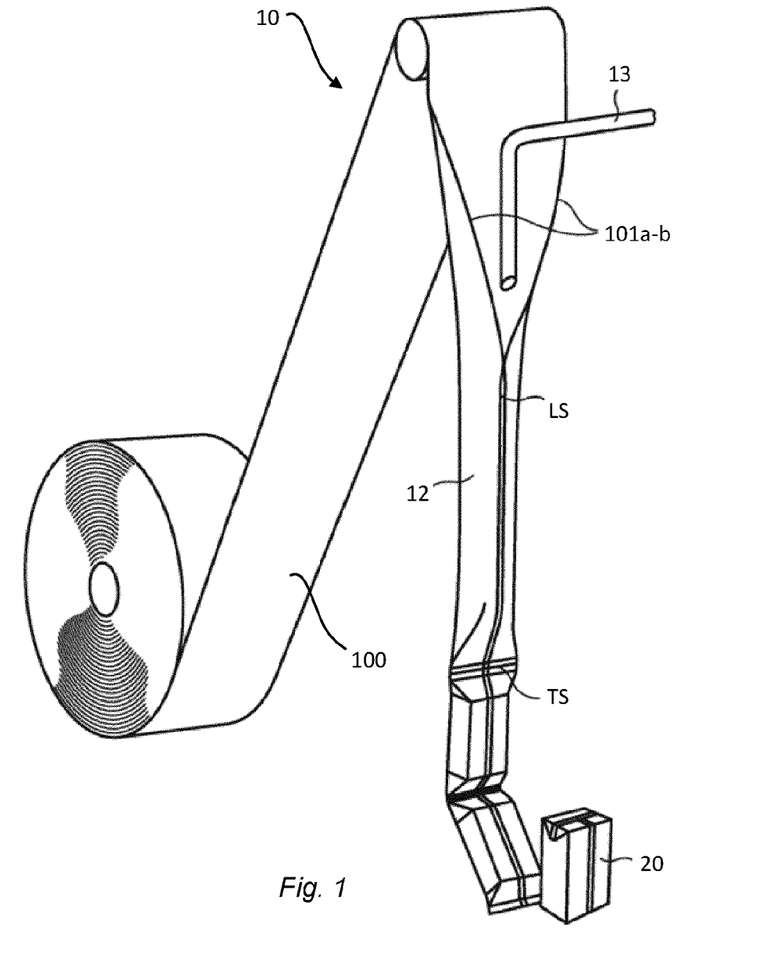
FIG. 1 is a schematic view of a packaging machine.

Starting in FIG. 1, the basic principle of a roll fed carton based packaging machine 10 is shown. The packaging machine 10 is configured for continuous packaging of e.g. liquid food products, and forms the general technical concept used for various different packaging systems, such as the commercially successful Tetra Brik® packaging system. The packaging machine 10 receives a packaging material 100, in the form of a continuous web (as is shown in FIG. 1).

After unwinding the packaging material 100 its longitudinal side edges 101a-b are brought together to form a longitudinal seal LS, thereby also forming a tube 12 of the packaging material 100. More particularly, the longitudinal side edges 101a-b are attached to each other continuously in an overlapping manner. The tube 12 is filled with a desired product, preferably a liquid food product, from a filling pipe 13.

A series of packages 20 are formed from the tube 12 by making transversal sealings TS at an end of the tube 12, and cutting off the sealed portions, each sealed portion representing an individual package 20, as they are formed. In order to shape the packages 20 different forming tools can be used during the transversal sealing operation, or a separate forming process can be performed after the transversal sealing has been performed.

Alternatively, a blanks-fed packaging machine is used. The blanks, in the form of pre-cut pieces of packaging material with two ends heat sealed together such that a folded tubular sleeve is formed, are fed to the filling machine. The blanks are erected into an open sleeve, and then folded and sealed such that a closed top or bottom is formed. It is thereafter filled with product and sealed and folded such that a filled package container is obtained.

It should be mentioned that the term "longitudinal" is referring to the feeding direction of the tube 12, i.e. the machine feeding direction. The term "transversal" is referring to a direction perpendicular to the longitudinal direction.

Figure 2:
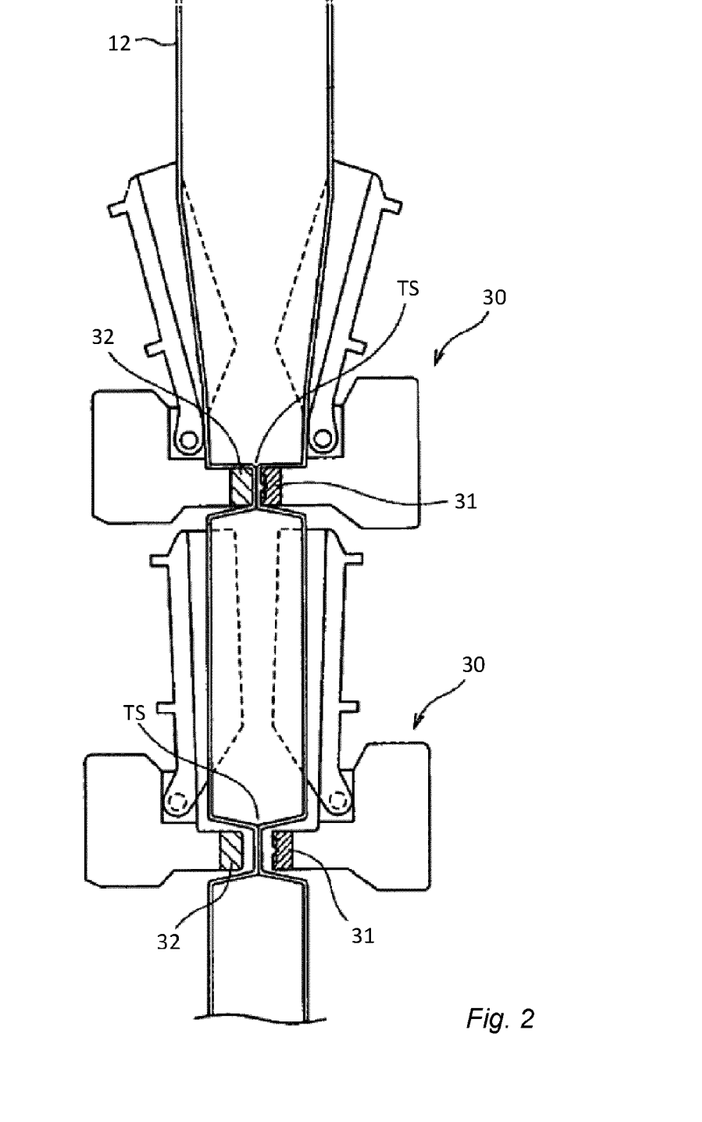
FIG. 2 is a cross-sectional view of a sealing system according to an embodiment, for use with a packaging machine.

The transversal seals TS are typically formed by a sealing system 30, not illustrated in FIG. 1 but shown schematically in FIG. 2. Two sets of transversal sealing systems 30 are provided, arranged in a downstream configuration (one sealing system 30 being arranged downstream another sealing system). By operation of the sealing system, a high-frequency inductor or another electromagnetic device 31 and a counter element 32, positioned on movable sealing jaws, will move and press together the filled packaging material tube 12 in the traversal direction to form TS seal zones. As electromagnetics losses, e.g. eddy currents, are generated in a workpiece of the packaging material 100, the packaging material 100 will be heated to form the transversal TS seal zones at every predetermined interval by high-frequency induction heating. For creating the eddy currents in the workpiece, the inductor 31 is connected to a high frequency power supply, as will be further explained below.

It should be mentioned that the movement of the sealing jaws will also provide a forward motion of the tube 12, whereby the seals TS will be arranged at predetermined intervals.

Then, each transversal TS seal zone is cut along a centerline by a cutting knife (not illustrated) and divided to form individual packaging containers 20. Final forming of the package container 20 can be configured in many different ways, in order to obtain various package container shapes such as a brick-shape (parallelepiped), a hexagonal prism, octagonal prism, tetrahedral shape, gable-top containers and the like.

Figure 3:
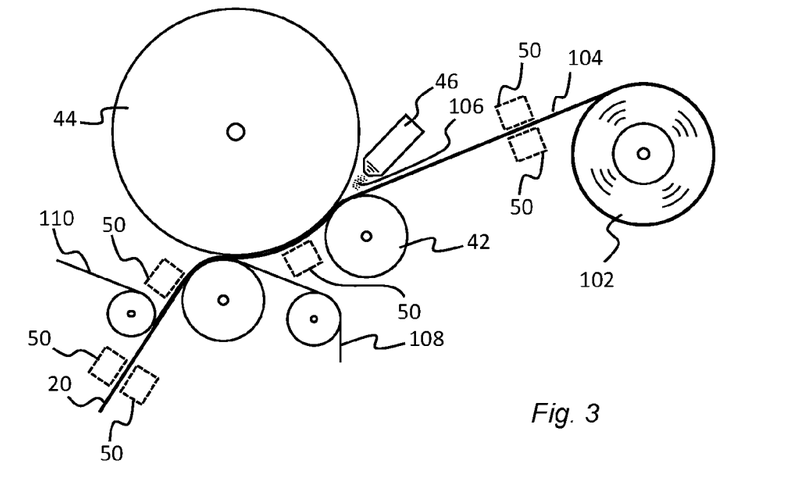
FIG. 3 is a side view of a converting apparatus for manufacturing a packaging material according to various embodiments.

Now turning to FIG. 3, a schematic overview of a laminating process is shown, i.e. the process of manufacturing the packaging material 100. The packaging material manufacturing process is based on the concept of laminating several layers of thermoplastic material to a core layer.

Production of the packaging material 100 proceeds such that a reel 102 of a core layer web 104 of paper or board is paid out and led over a nip roller 42 into contact with a cooling roller 44. With the aid of an extruder 46, a continuous film of thermoplastic material 106 is extruded in between the core layer web 104 on the nip roller 42 and the cooling roller 44, in which event the expelled film of thermoplastic material 106, e.g. of polyethylene, will adhere to the core layer 104. By compression between the nip roller 42 and the cooling roller 44, the core layer 104 and the film 106 are united to form a composite packaging material laminate. In that same operation, an optional further web of material (not shown) may be led over the cooling roller to also be laminated to the core layer web, by means of the intermediate extruded bonding layer of thermoplastic material 106. In addition to the above-mentioned converting process, an outside layer 108 of liquid-tight and heat-sealable thermoplastic material and an inside layer 110 of liquid-tight and heat-sealable thermoplastic material may also be added in order to form the packaging material 100. The outside and inside layers 108 and 110 may be laminated to the previously laminated core layer web by means of film lamination as shown in FIG. 3, or as extrusion coating of a molten thermoplastic material, as according to the principle described above, such as of heat-sealable polyethylene polymers. One or more barrier layers may also be part of the packaging material 100, and may be laminated to the core layer web, preferably on that side of the core layer web, which is to form the inside of a packaging container from the resulting laminated packaging material.

As described earlier induction heating and sealing requires the provision of a workpiece of the packaging material 100, in which workpiece eddy currents can be generated as the workpiece is subjected to the high frequency magnetic field from the inductor 31. This workpiece, which traditionally has been provided in the form of an Aluminum layer across the entire packaging material 100, may instead be provided by an applicator 50. As will be explained further, the workpiece is formed by a carbon-based material, preferably provided locally at the packaging material 100.

In FIG. 3 the applicator 50 is shown only schematically, and the applicator 50 could be realized in many different ways. For example, the applicator 50 could be a printing unit, such as an inkjet unit, whereby the workpiece material is provided in the form of a carbon-based, preferably a graphene-based, ink. The applicator 50 could in other embodiments be realized as a spray unit, a roll applicator, etc. Importantly, the applicator 50 is configured to apply a layer of a carbon-based material at specific locations on the packaging material 100.

The applicator 50 may not even form part of the laminating process but may instead by used before or after the laminating process. For example, the applicator 50 could be arranged in the package machine 10, such that the carbon-based layer is applied before the packaging material 100 is transformed into a sealed tube 12.

If forming part of the laminating process, the applicator 50, as described with reference to FIG. 3, could be arranged at various locations. Several applicators 50 are therefore indicated in FIG. 3, although it should be understood that it may be necessary with only one applicator 50, at a single location.

For example, the applicator 50 may be arranged so that the workpiece is printed on the outer side of the core layer 104, or on the inner side of the core layer 104 before lamination. Other possible positions of the applicator 50 are illustrated in FIG. 3.

In a preferred embodiment, the applicator 50 is arranged such that the carbon-based material is applied at the inside of the packaging material 100, beneath the innermost heat sealable layer, or on the inside surface of a barrier film. In an optional embodiment, the applicator 50 is arranged such that the carbon-based material is applied at the outside of the core layer, such as paperboard, of the packaging material 100, in order to allow for heat sealing of the longitudinal edges of the packaging material 100 when the tube 12 is formed.

Figure 4:
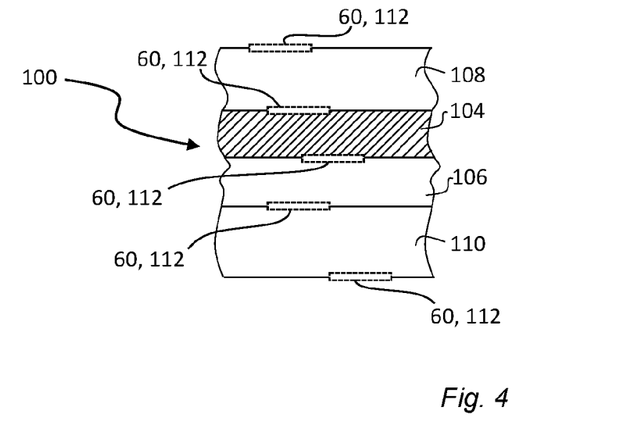
FIG. 4 is a cross-sectional view of a packaging material according to an embodiment.

An example of a resulting packaging material 100 is shown in FIG. 4, in cross-section, also indicating the workpiece 60 in the form of a carbon-based, preferably graphene-based, layer 112. The workpiece 60 could, depending on the location of the applicator 50 during, before, or after the lamination process, be arranged at any of the interfaces between the different material layers; on the external side of layer 110, between layers 110 and 106, between layers 106 and 104, between layers 104 and 108, or on the external side of layer 108. If barrier layers are present, the workpiece 60 may be arranged on either side of such barrier layer, but preferably, the carbon-based workpiece portion or layer is provided on the inside of the core layer, or of the optional barrier layer and the inside layer 110.

Figure 5:
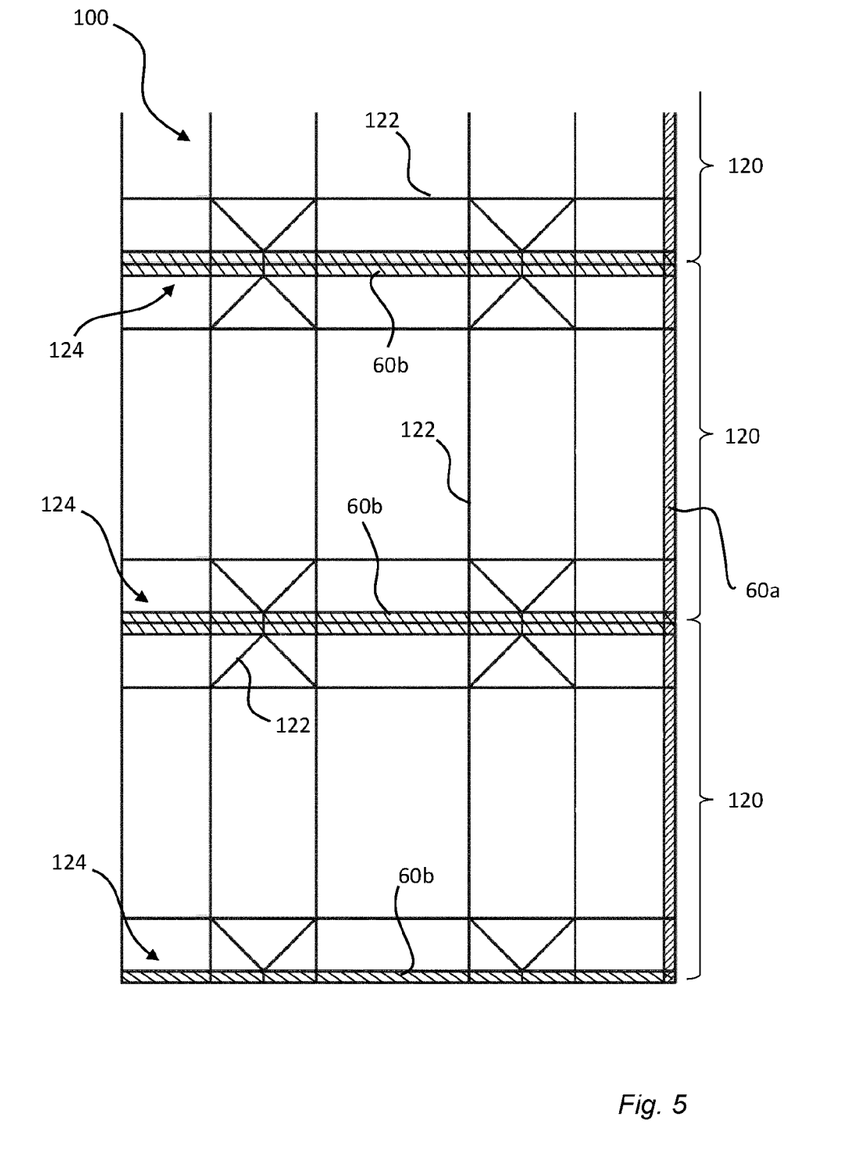
FIG. 5 is a planar view of a packaging material according to an embodiment.

Now turning to FIG. 5, an example of a packaging material 100 is shown. The packaging material 100 is provided in the form of a continuous web, e.g. to be used by a packaging machine 10 as shown in FIG. 1. The web thereby includes a series of segments 120, each segment 120 being later used to form an individual package 20. In FIG. 5, three segments 120 are shown. Each segment 120 has a plurality of crease lines 122, and each segment 120 is also provided with at least one workpiece 60. In the shown example, a longitudinal workpiece 60a is arranged along one longitudinal edge of the packaging material, and several workpieces 60b are arranged in respective sealing areas 124, each sealing area 124 corresponding to the position of the transversal sealings TS to be formed.

Figure 6:
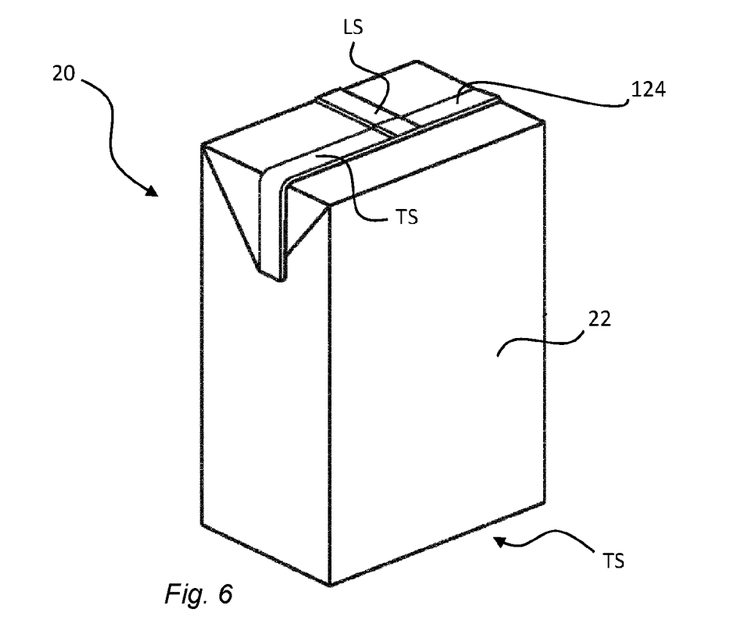
FIG. 6 is an isometric view of a packaging container according to an embodiment.

A package 20 resulting from the packaging material 100 of FIG. 5, processed by a packaging machine 10 of FIG. 1, is shown in FIG. 6. The package 20, forming a main body 22 of the packaging material 20, has one longitudinal sealing LS, and two transversal sealings TS. At least one sealing, preferably at least the two transversal sealings TS, are arranged at respective sealing areas 124. The workpiece 60, formed by means of a carbon-based, preferably graphene-based, layer, is arranged at said sealing areas 124.

The packaging material 100 is formed by a core bulk layer 104, which may be a fibre based material, such as a cellulose based material. The core layer 104 may be a cellulose-based material, such as a paper or a carton or paperboard. The packaging material 100 also has at least one carbon-based, preferably graphene-based, layer 112 being configured to form a workpiece 60 of an associated sealing system 30. As mentioned earlier, the carbon-based layer 112 is configured to form a workpiece 60b of a transversal sealing system 30 and/or a workpiece 60a of a longitudinal sealing system (not explicitly shown but indicated in FIG. 1).

The carbon-based, preferably graphene-based, layer 112 can e.g. be laminated into the packaging material 100, or it may be arranged on the exterior surface of the packaging material 100.

Although not explained earlier, in some embodiments the carbon-based layer 112 could be distributed across the entire width and length of the packaging material 100 such that the carbon-based layer 112 forms a continuous layer.

However, in order to allow for induction sealing it is necessary to provide the carbon-based layer 112 only locally at one or more areas 124, thereby forming local workpieces 60 of the associated sealing systems 30.

The carbon-based material used for forming the workpiece 60 is preferably in the form of an ink, thereby allowing standard equipment to be used (such as ink jet technology). The ink may comprise carbon of the crystalline structure of graphite and graphene. The carbon-based layer preferably comprises graphene or reduced graphene oxide, at an amount of at least 50 weight-% based on dry weight, in one or more layers. Preferably, the carbon-based layer comprises a dispersion of exfoliated flakes of graphene or reduced graphene oxide.

So far, it has not been successful to manufacture pure graphite inks or dispersions with a sufficient quality and physical properties in order to be used within the concept of the present invention, i.e. to heat seal adjacent layers of a packaging material. This is due to the intrinsic properties of the graphite material when it is in particle form, not providing the required conductivity. By instead using graphene or reduced graphene oxide, improvements are possible. Thus, it has hitherto not been possible to exfoliate graphite such that it has been possible to provide a coating or a layer which has both the required mechanical flexibility properties and the required conductivity, due to the bulky nature of graphite materials. If graphite would be possible to apply as very thin layers, of the nano-dimensions, its inherent properties are such that good induction properties should be possible. However, a homogeneous graphite layer necessarily needs to be too thick and too brittle such that the layer breaks, and particulate graphite or graphite in the form of exfoliated flakes cannot reach the concentration in a dispersion such that sufficient conductivity or susceptibility to magnetic losses is reached. Accordingly, for sufficient conductivity, substantial amounts of metal particles would be needed in a mixture with only graphite or based on graphite.

On the other hand, a monolayer of graphene e.g. obtained by chemical vapour deposition (CVD) could be considered the thinnest layer possible of a graphite material, having the desired mechanical properties. The conductivity of a perfect, continuous graphene monolayer is high, but since it is a monolayer, it would be way too thin to generate a significant heating effect, to perform a proper heat seal by current technology and allowed frequencies.

Figure 7:
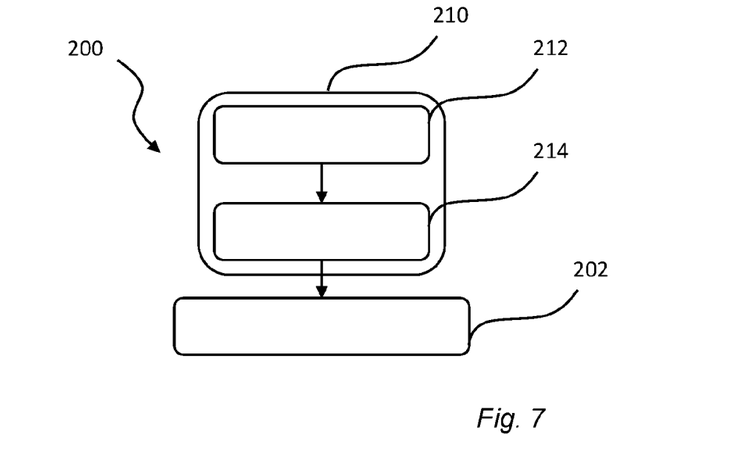
FIG. 7 is a schematic view of a method for manufacturing a package and a packaging material according to an embodiment.

Now turning to FIG. 7, a method 200 for manufacturing a package container 20 is schematically illustrated. The method 200 includes a sub-method 210 of manufacturing a packaging material.

The sub-method 210 comprises a step 212 of laminating one or more plastic layers 106, 108, 110 to a core layer 104, and a step 214 of applying at least one carbon-based, preferably graphene-based, layer 112 to said packaging material 100. The at least one carbon-based layer 112 forms a workpiece 60 of an associated sealing system 30.

The step 214 of applying the carbon-based layer 112 can be performed in-line during a packaging material converting process, or as a post-process at the end of a packaging material converting process.

The method 200 for manufacturing the packaging container 20 further comprises a step 202 of sealing the packaging material 100 by activating an inductor 32 such that heat is generated in the workpiece 60 of the packaging material 100.

The electro-magnetic device, such as the inductor, may be operated at frequencies from 100 kHz to above 27 MHz, depending on the design of the heat-sealing system. Within the higher MHz range, specific frequency bands are allocated by national authorities, such as 13.65 MHz and 27.12 MHz. At lower ranges, the frequency of operations may be more freely selected. Preferably, the electromagnetic device is operating at a frequency from 0.5 MHz to above 27 MHz, such as from 1 MHz to above 27 MHz such as from 13 MHz to above 27 MHz.

As will be explained by the following examples, the exact thickness and resistivity, as well as the material type of the carbon-based layer, can vary depending on the desired efficiency, current, quality factor, etc. For the examples described herein, the thickness of the carbon-based layer 112 is preferably constant and in the range of 0.001-500 μm such as from 0.01 to 500 μm, such as from 0.1 to 300 μm, such as from 1 to 300 μm depending on sealing system properties, such as power signal frequency, etc.

Figure 8A:
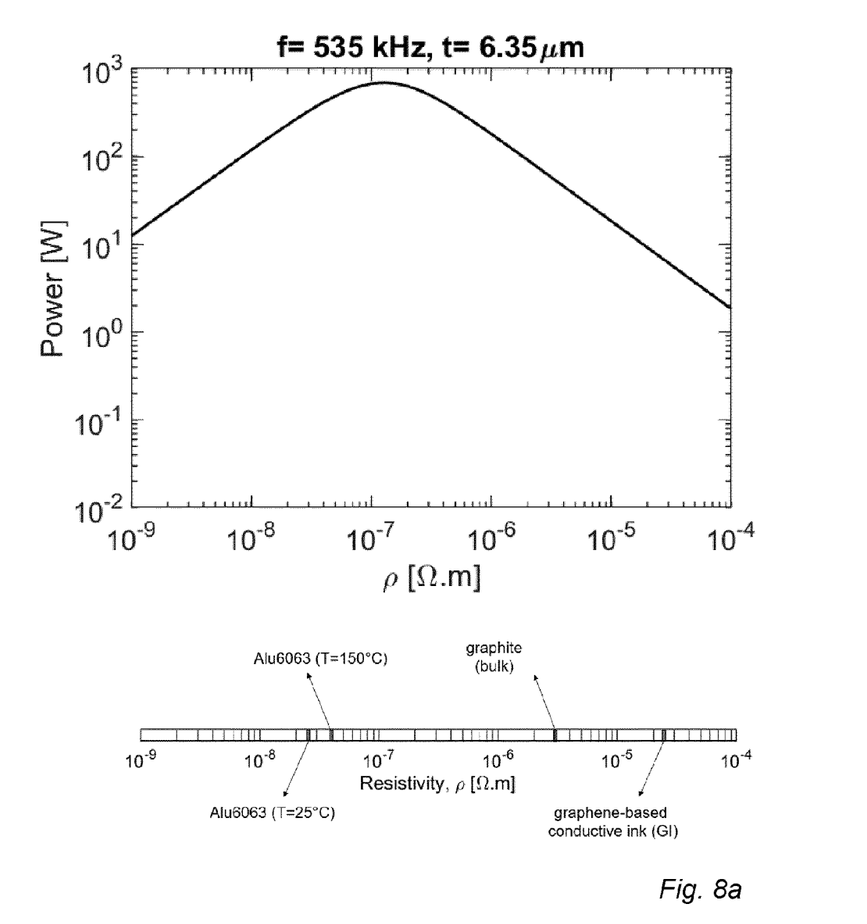
FIGS. 8a-b are diagrams showing induced power as a function of resistivity for different workpiece materials.

FIG. 8a is a diagram showing simulations of the induced power in the workpiece as a function of workpiece material resistivity for a workpiece thickness of 6.35 μm. The power signal is having a frequency of 535 kHz, which is a drive frequency for induction sealing systems in the beverage carton packaging industry. The inductor model employed in the simulation study is an inductor designed for the longitudinal sealing application. In the model, the workpiece minimum distance from the inductor is set to 1 mm.

The horizontal bar below the graph indicates relevant resistivity values for the investigated materials. The first material is AA 6063, a commercially available Aluminum alloy, kept at 25° C. The second material is the same AA 6063, but kept at an elevated temperature of 150° C. The two first materials (AA 6063) represent reference values for the traditional Aluminum-based workpieces of prior art. The third material is an ideal, hypothetical graphite layer, which is applied homogeneously but unrealistically thin to still have the mechanical properties desired. The fourth datapoint represents the hypothetical use of a monolayer of graphene (One single graphene monolayer would hypothetically have a good resistivity for the application, but, since it is a monolayer, it would be too thin to generate a significant heating effect). The fifth material is a 4-layer graphene flake ink (GI) as developed by S. Majee et al., Scalable inkjet printing of shear-exfoliated graphene transparent conductive films, Carbon 2016; 102:51-7.

In the graph, it is shown that there is an optimum value of resistivity to boost power coupling between inductor and workpiece, as a consequence of the counterbalance of induced current and induced electromotive force, according to Lenz's law. In the range corresponding to typical graphene inks, which usually have a resistivity in the range of $10^{-4}$ Ωm or higher, we discovered that the lower the resistivity is, the higher the induced power will be. Therefore, the graphene ink proposed by Majee et al., was further investigated due to its relatively low resistivity, compared to other graphene inks. Accordingly, by increasing the thickness of such an applied ink layer, the induced power may be further increased.

A compact, flexible, compressed sheet of layered graphene-flakes, such as described above, at a thickness of 6.35 μm, features an even lower resistivity in the order of $10^{-7}$ Ωm, thus enabling further increasing, or even maximizing, system power transfer.

Figure 8B:
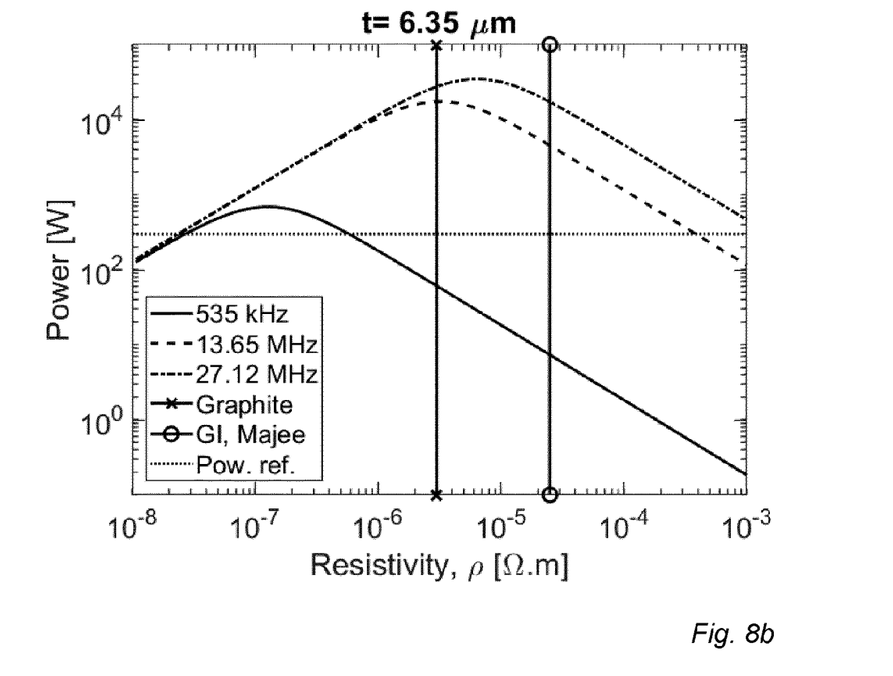

FIG. 8b is a simulation of the induced power as a function of resistivity for the same hypothetical graphite layer and for the graphene ink (both at a layer thickness of 6.35 μm), at different power frequencies. As is evident from the diagram, a significant increase of induced power is obtained for frequencies in the MHz range. For the sake of comparison, a reference line in the graph (Pow. Ref.) indicates the power value corresponding to the standard workpiece made of aluminium AA 6063 at frequency 535 kHz, and with the same thickness of 6.35 μm.

Figure 9:
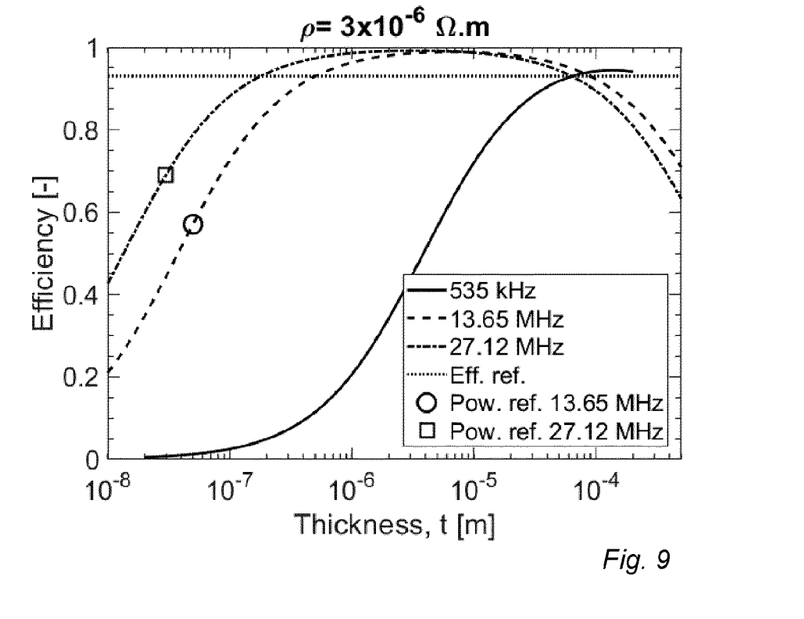
FIG. 9 is a diagram showing efficiency as a function of workpiece thickness for a first carbon-based layer.

For the graphite material, having a resistivity of $3*10^{-6}$ Ωm, the calculated efficiency as a function of hypothetical layer thickness is shown in FIG. 9, for the different frequencies. The marks named power reference (Pow. ref) indicate the minimum thicknesses of graphite which would be needed, at MHz frequencies, to get the same induced power as the 6.35 μm AA 6063 reference at 535 kHz. However, at those thicknesses, around 50 nm, the efficiency of the system would be significantly lower compared to the reference, possibly leading to risks for overheating or overvoltage. At 13.65 MHz, a workpiece thickness of at least about 500 nm is needed to keep a relatively high efficiency, while at 27.12 MHz, a workpiece thickness of only about 200 nm should be sufficient. By further increasing the thickness it is possible to reach the plateau region where less sensitivity to the thickness is expected. This plateau region is significantly wider than for AA 6063 foil at 535 kHz, in the investigated thickness range.

In the plot, the "Eff. ref." line corresponds to the efficiency of the standard system featuring a 6.35 μm thick AA 6063 foil and working at 535 kHz.

Figure 10:
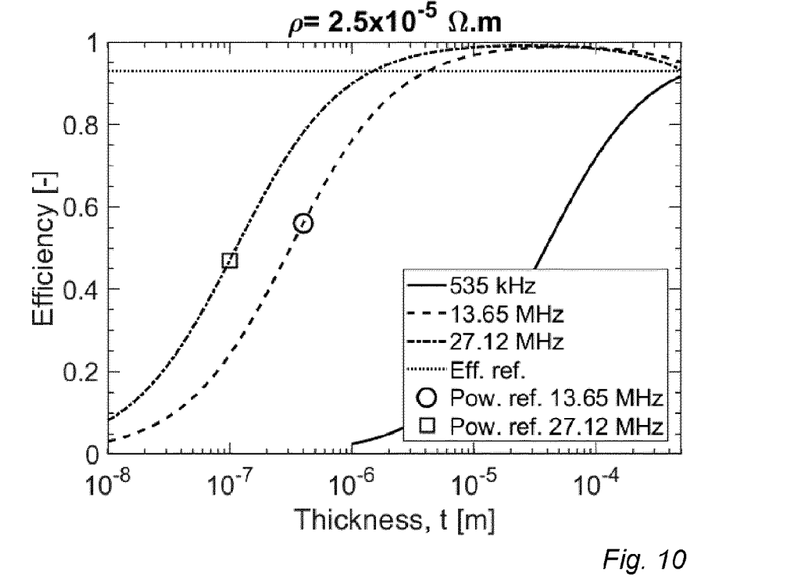
FIG. 10 is a diagram showing efficiency as a function of workpiece thickness for a second carbon-based layer.

For the graphene ink material, having a resistivity of $2.5*10^{-6}$ Ωm, the efficiency as a function of layer thickness is shown in FIG. 10, for the different power frequencies. At 13.65 MHz, a workpiece thickness of at least about 4.5 μm is needed to keep a relatively high efficiency. At 27.12 MHz, a workpiece thickness of at least about 1.5 μm is needed to keep a relatively high efficiency. By further increasing the thickness it is possible to reach the plateau region where less sensitivity to thickness is expected. Also this plateau region is significantly wider than for AA 6063 foil at 535 kHz in the investigated thickness range. The reference values have the same meaning as explained above for FIG. 9

A summary of the simulations is further shown in the following table.

| Material | Freq [kHz] | t [μm] | I [A] | eff. [0-1] | Q norm [—] |
|---|---|---|---|---|---|
| Alu6063 | 535 | 6.35 | 100 | 0.93 | 1 |
| Graphite | 535 | 30 | 100 | 0.88 | 1.5 |
| Graphene ink | 535 | 300 | 100 | 0.93 | N/A |
| Graphite | 535 | 6.35 | 225 | 0.93 | N/A |
| Graphene ink | 535 | 6.35 | too high | N/A | N/A |
| Graphite | 13.65e3 | 0.050 | 100 | 0.57 | N/A |
| Graphene ink | 13.65e3 | 0.400 | 100 | 0.56 | N/A |
| Graphite | 13.65e3 | 0.500 | 32 | 0.93 | 4.3 |
| Graphene ink | 13.65e3 | 4.5 | 13 | 0.93 | 0.3 |
| Graphite | 27.12e3 | 0.030 | 65 | 0.69 | N/A |
| Graphene ink | 27.12e3 | 0.100 | 100 | 0.47 | N/A |
| Graphite | 27.12e3 | 0.200 | 25 | 0.93 | 7 |
| Graphene ink | 27.12e3 | 1.5 | 26 | 0.93 | 4 |

Hence, by employing frequencies in the MHz range it is possible to have a good efficiency using relatively thin layers, thereby allowing the possibility to use carbon-based layers, such as graphene-based layers, as workpieces in the packaging material for induction heating sealing.

The invention claimed is:

1. A packaging material that does not include aluminum and that comprises a core layer and at least one layer of a heat sealable material laminated thereto, and at least one carbon-based layer or portion adjacent the layer of heat sealable material and configured to form a workpiece of an associated sealing system, which workpiece generates heat by interaction with an electromagnetic field such that the heat at least partly melts at least a portion of the adjacent layer of heat sealable material so that the packaging material is formable into a filled and sealed packaging container, the at least one carbon-based layer or portion being a graphene-based material comprising one or more materials selected from the group consisting of exfoliated flakes of graphene, reduced graphene oxide, graphene monolayer material and multilayer graphene platelets, having up to 20 stacked monolayer flakes of graphene.

2. The packaging material according to claim 1, wherein the core layer is a cellulose-based material, such as paper or paperboard.

3. The packaging material according to claim 1, wherein the carbon-based layer or portion is configured to form a workpiece of a transversal sealing system and/or a workpiece of a longitudinal sealing system.

4. The packaging material according to claim 1, wherein the carbon-based layer or portion is laminated into the packaging material.

5. The packaging material according to claim 1, wherein the carbon-based layer or portion is applied locally only at one or more areas corresponding to a location of the workpieces of the associated sealing systems.

6. The packaging material according to claim 1, wherein the graphene-based material comprises at least from 50 weight-% based on dry weight, of one or more of the materials selected from the group consisting of the exfoliated flakes of graphene, the reduced graphene oxide, the graphene monolayer material and the multilayer graphene platelets.

7. The packaging material according to claim 1, wherein the graphene-based material layer comprises less than 50 weight-% of conductive and/or magnetic particles, based on dry weight.

8. The packaging material according to claim 1, wherein the graphene-based material is obtainable from a composition comprising a dispersion of one or more materials selected from the group consisting of the exfoliated flakes of graphene, the reduced graphene oxide, the graphene monolayer material and the multilayer graphene platelets.

9. The packaging material according to claim 1, wherein the carbon-based layer or portion is applied to the packaging material in the form of an ink and/or a dispersion coating.

10. The packaging material according to claim 1, wherein the carbon-based layer or portion is applied to the packaging material in the form of a pre-manufactured, compressed sheet of layered exfoliated flakes of graphene, reduced graphene oxide or graphene monolayer material or multilayer graphene platelets.

11. The packaging material according to claim 1, wherein the thickness of the carbon-based layer or portion is in the range of 0.001-500 μm.

12. The packaging material according to claim 1, wherein the thickness of the carbon-based layer or portion is constant.

13. The packaging material according to claim 1, wherein the heat sealable material comprises a thermoplastic polymer.

14. A method of manufacturing a packaging material, as claimed in claim 1, comprising laminating one or more layers of a heat sealable material to a core layer, and applying the at least one carbon-based layer or portion to said packaging material, wherein the at least one carbon-based layer or portion forms a workpiece of an associated sealing system.

15. The method according to claim 14, wherein the applying of the carbon-based layer or portion is performed in-line during a packaging material laminating process.

16. The method according to claim 14, wherein the applying of the carbon-based layer or portion is performed as an operation step after or at an end of a packaging material lamination process.

17. A packaging container comprising a main body being formed by a packaging material, as defined in claim 1, and having at least one heat seal arranged at a sealing area, wherein the packaging material comprises a carbon-based layer or portion arranged at said sealing area.

18. A method for manufacturing the packaging container of claim 17, comprising heat sealing a packaging material by activating an electromagnetic device such that heat is generated in a workpiece of said packaging material, wherein said workpiece is formed by the carbon-based layer or portion.

19. The method according to claim 18, wherein the electromagnetic device is operating at a frequency from 100 kHz to above 27 MHz.

* * * * *